US007464249B2

(12) United States Patent
Hennessy et al.

(10) Patent No.: US 7,464,249 B2
(45) Date of Patent: Dec. 9, 2008

(54) SYSTEM AND METHOD FOR ALIAS MAPPING OF ADDRESS SPACE

(75) Inventors: James P. Hennessy, Vestal, NY (US);
William A. Holder, Vestal, NY (US);
Damian L. Osisek, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 11/190,224

(22) Filed: Jul. 26, 2005

(65) Prior Publication Data

US 2007/0028072 A1 Feb. 1, 2007

(51) Int. Cl.
*G01F 12/00* (2006.01)
(52) U.S. Cl. ............... 711/203; 711/202; 711/209; 711/212; 711/221
(58) Field of Classification Search ............ None
See application file for complete search history.

(56) References Cited

U.S. PATENT DOCUMENTS

| 5,230,069 A | 7/1993 | Breisford et al. ......... 395/400 |
| 5,555,385 A | 9/1996 | Osisek ................... 395/401 |

OTHER PUBLICATIONS

Barham et al. Xen and the Art of Virtualization. 2003. ACM Press. Proceedings of the nineteenth ACM symposium on Operating systems principles.pp. 164-177.*

Love, Robert. *Linux Kernel Development.* Sams Publishing, Indianapolis, Indiana. Chapter 10 Memory Management, pp. 182-184.
IBM Corporation. *CP Command and Utility Reference,* Version 3 Release 1.0. IBM Publication SC24-5967-00, Feb. 2001, pp. 174-178 (Define Storage Command).
IBM Corporation. *Enterprise Systems Architecture/390 Principles of Operation.* IBM Publication SA22-7201-08, 2003, pp. iii-xv, 1-9, 2-2 to 2-5, 3-1 to 3-8, 4-6, 5-8, 7-117 to 7-118.
IBM Corporation. *z/Architecture Principles of Operation.* IBM Publication SA22-7832-02, 2003, pp. iii-xv, 1-2, 1-5, 1-10, 1-17, 2-2 to 2-3, 3-1 to 3-7, 3-26 to 3-62, 4-6 to 4-7, 5-7 to 5-8, 7-161to 7-162.

* cited by examiner

*Primary Examiner*—Hyung Sough
*Assistant Examiner*—Kaushikkumar Patel
(74) *Attorney, Agent, or Firm*—Arthur J. Samodovitz; Shelley M Beckstrand

(57) ABSTRACT

Mapping of address space by providing real storage including first and second address spaces. The second address space is smaller than and contained within the first address space. Provided within virtual storage is a system execution space. Providing within the system execution space is a system execution area having a size equal to or less than the second address space. The system execution area includes a control program having a first portion capable of addressing the first address space and the system execution space, a second portion constrained to address only the second address space and the system execution area, and at least one alias page. Responsive to a control program request for a first page in the virtual storage, a first frame is assigned in real storage corresponding to the page. Responsive to a request from the second portion of the control program for the first page, allocating an alias page in the system execution area, the alias page backed by the first frame.

13 Claims, 8 Drawing Sheets

SYSTEM AND METHOD FOR ALIAS MAPPING OF ADDRESS SPACE

CROSS REFERENCES TO RELATED APPLICATIONS

U.S. patent application Ser. No. 11/190,710 entitled "SYSTEM AND METHOD FOR TESTING FOR MEMORY ADDRESS ALIASING ERRORS" filed concurrently herewith is assigned to the same assignee hereof and contains subject matter related, in certain respects, to the subject matter of the present application. The above-identified patent application is incorporated herein by reference.

BACKGROUND OF THE INVENTION

1. Technical Field of the Invention

This invention relates to mapping of an address space. More particularly, it relates to dual mapping of selected portions of a large address space as needed for aliasing into a smaller address space.

2. Background Art

Referring to FIG. 1, in the IBM Virtual Machine (z/VM) operating system, control program (CP) 50, working with 31-bit addressing capabilities in real storage 30, runs a virtual machine in virtual address space 32 of some size. This virtual machine operates on a guest page 40 in virtual storage 32 as though it were real space.

Generally a guest is a virtual machine, with one or more virtual address spaces which it thinks are in real storage. However, when a virtual machine is executing, CP 50 has instantiated, as is represented by line 41, guest storage, such as page 40, in real storage 30 at page location 42 below 2G line 36 (2G denotes two gigabytes, the limit of 31-bit addressing). Thus, CP 50 code written with 31 bit addressing, as it executes a virtual machine, works with page 42 which is guest page 40 made resident in real storage 30.

In the IBM z/Architecture, on which the IBM z/VM operating system runs, 64-bit registers and addresses are provided, giving much more real storage available to the hardware which CP 50 can use if code using 31-bit addresses is converted to use 64-bit addresses. Portions of the z/VM control program (designated CP64) have been upgraded to operate in 64-bit addressing mode and other legacy code (designated CP31) remains in 31-bit addressing mode. Stated otherwise, the IBM z/VM operating system needs to efficiently exploit a 64-bit address space, but much legacy code that remains from earlier versions of VM has already been written to function in a 31-bit address space. There is, consequently, a need in the art for a method and system which can refer to the much larger memory space without re-writing the legacy code.

Referring to FIG. 2, an initial solution used by the IBM Virtual Machine (z/VM) operating system is to have a small amount of code CP64 51 that is capable of addressing the whole 64-bit space, and using that code to copy any desired pages as needed. If code in CP31 50 needs to refer to a page 46 which has been instantiated (as is represented by line 43) in storage 30 frame 46 above 2G, that page 44 is copied (as is represented by line 47 from frame 46 to frame 48) to a location 48 below 2G, manipulated as desired, and later may be copied back (as is represented by line 47 from frame 48 to frame 46) to a location 46 above 2G. The drawback to this solution is that it is inefficient, therefore slow.

Another consequence of this initial solution is that any page pinned (e.g., for an I/O operation) must first be moved below the 2G line, even if the function requesting the pinning is 64-bit capable. This is necessary so that if the page is referenced from 31-bit code CP31 50 while it is still pinned, it will be accessible using a 31-bit address.

Therefore, this initial solution restricts the total amount of storage that can be simultaneously pinned to less than 2G, regardless of the total storage size, and may constrain the I/O bandwidth of the system. Similarly, under the initial solution, any fixed storage (storage which is declared not pageable for performance purposes) is limited to residing below the 2G line, so that 31-bit code can reference the fixed storage when needed. Thus, the aggregate fixed storage for all users is limited to 2G.

SUMMARY OF THE INVENTION

A system, method and program storage device are provided for mapping address space by providing real storage including first and second address spaces, the second address space being smaller and contained within the first address space; providing virtual storage; providing within the virtual storage a system execution space; providing within the system execution space a system execution area having a size equal to or less than the second address space; providing within the system execution area a control program including first and second portions, the first portion capable of addressing the first address space and the system execution space, and the second portion constrained to address only the second address space and the system execution area; providing within the system execution area at least one alias page; responsive to a control program request for a first page in the virtual storage, dynamically assigning a first frame in the real storage corresponding to the page; responsive to a request from the second portion of the control program for the first page, dynamically allocating an alias page in the system execution area and mapping the alias page to the first frame.

In accordance with features of the present invention, responsive to a first request from the first portion of the control program for pinning the first page, pinning the first page; and responsive to a second request from the second portion of the control program for concurrently pinning the first page, allocating an alias page mapped to the first frame (if not already allocated) and pinning the alias page for use by the second request, without moving the first page into the second address space.

Other features and advantages of this invention will become apparent from the following detailed description of the presently preferred embodiment of the invention, taken in conjunction with the accompanying drawings.

BEST MODE FOR CARRYING OUT THE INVENTION

In accordance with the preferred embodiment of the invention, dual mapping is utilized to relate pages in virtual storage to frames in real storage.

Figure 3:
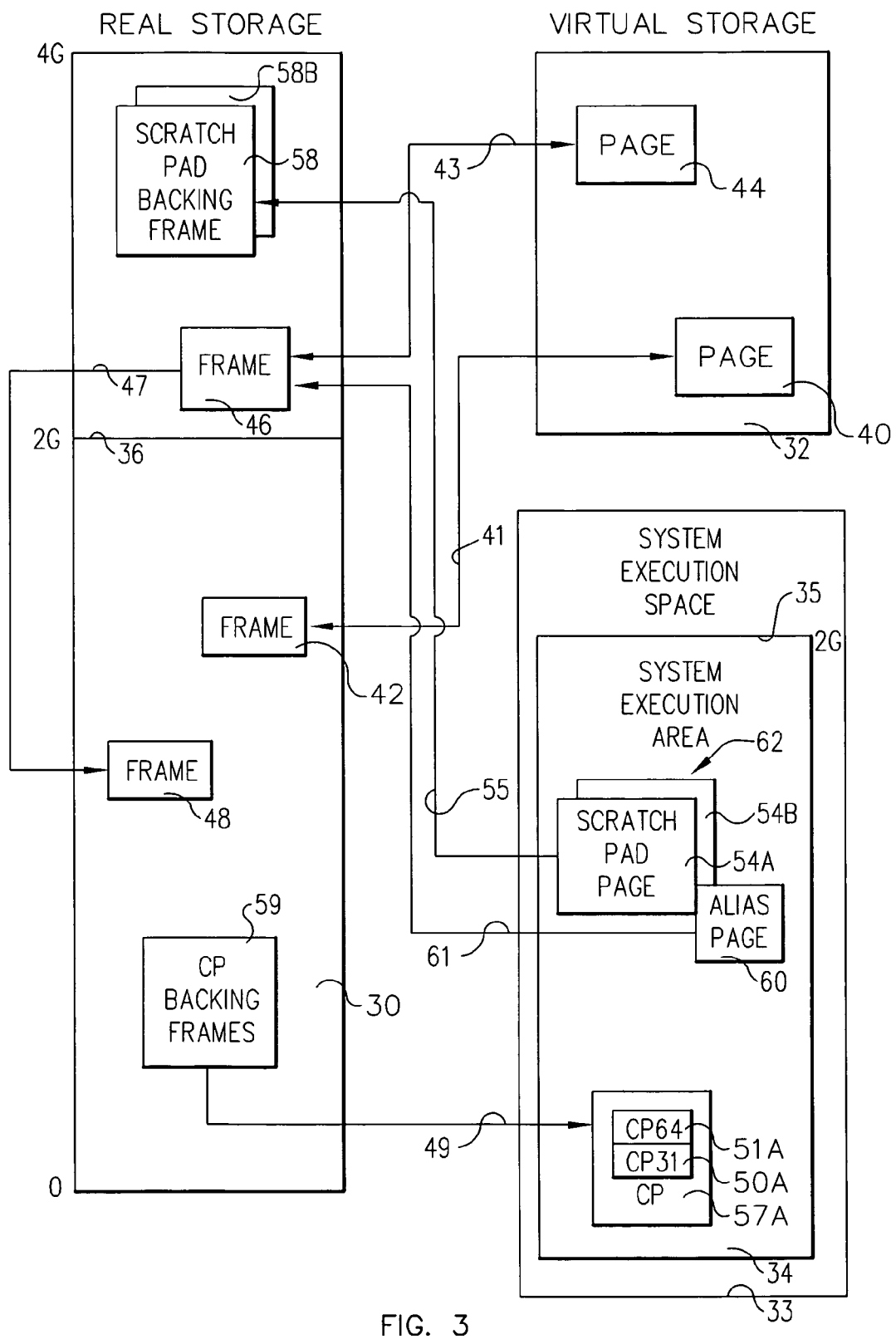
FIG. 3 is a schematic representation of storage and execution space components in accordance with the preferred embodiment of the invention.

Referring to FIG. 3, this dual mapping includes a first mapping whereby a virtual page 44, for instance a page of user or application storage or virtual machine storage, is contained in real frame 46, and a second mapping whereby an alias page 60 maps that real frame 46 and therefore the virtual page 44. The address of alias page 60 is chosen to be one that 31 bit CP31 50A can understand. While the address of the virtual page 44 and the address of the real frame 46 are both 64 bit addresses, the address of alias page 60 is always a 31 bit address.

In the present invention, the processing of "aliasing" refers to this second mapping. Thus, aliasing is the addition of the second mapping with a system managed 31 bit address into the system execution area 34 to give a 31 bit name for a 64 bit entity.

The present invention introduces the concept of System Execution Space (SXS) 34 distinct from the underlying 64-bit real space 30. Control Program (CP) 57A executes within this SXS 34, and addresses are resolved naturally through the mapping that defines this system execution space, as is customary with virtual addressing. When 31-bit code needs to refer to a pageable page (such as a user address space page 44), that page is made resident in a real frame 46 of storage (if not already resident), and then an alias address identifying alias page 60 is dynamically created in system execution area (SXA) 34 below 2G 35 in system execution space (SXS) 33, and is mapped (as is represented by line 61) to that real frame 46 wherever it resides in the 64-bit real space 30. The overhead of moving (as is represented by line 47) the page back and forth between frames 46 and 48 above and below the 2G line 36 is thereby avoided. These aliases 60 can be reclaimed and reused when no longer needed, so that this 2G region system execution area 34 of SXS 33 functions as a portal into the larger real address space 30.

As used herein, a page is a portion (such as 4 K bytes) of an address space. When a page 40 is being operated on, it is made resident in a page frame, or frame 42, which is a like sized portion of real storage 30. 64-bit aware code can request pinning of page 44 in-place (in frame 46) in the real space 30 (above or below the 2G line), without creating an alias 60 and without requiring a page move (such as is represented by line 47 from frame 46 to frame 48). This eliminates the 2G constraint on pages 44 et al. concurrently pinned for 64-bit capable functions. Conversion of 31-bit code may still be done for code which performs longer-term pinning, as for I/O, to use 64-bit addresses. If a 31-bit request arrives for a page while it is still pinned for 64-bit use, an SXA alias 60 address can immediately be created to satisfy the 31-bit request; thus, pinning by 64-bit code does not impede concurrent access by 31-bit code.

A capability is also provided for pinning pages into the SXA. These would still be subject to a 2G-concurrent limit. This provides an interface for compatibility for use in 31-bit code, and is typically used only for fewer and shorter-duration pinning operations, so that the 2G limit is not constraining.

Referring further to FIG. 3, control program (CP) 57A is part of an operating system. CP 57A was originally written to operate in 31 bit addressing mode. CP 57A works in virtual storage 34 below the 2G line, and its job is to run an application (such as a virtual machine) in a virtual address space 32 of some size. A user application or a virtual machine accesses user page 40 in virtual storage address space 32 as though it were real storage. This is accomplished by CP 57A instantiating (as is represented by line 41) user page 40 in frame 42 in real storage 30. CP 57, before implementation of 64 bit addressing, worked with a 31 bit real address, so frame 42 has a 31-bit address, which means that it is located in real storage 30 below the 2G line. CP 50 code has been written to deal with 31 bit addresses, including the addresses of user pages 40 that selectively are made resident pages 42.

In the context of the present invention, however, if CP is converted to 64-bit address capability with 64-bit registers, much more storage, above the 2G line 36, is made available to system hardware, and CP 57A can use that available storage.

With that capability, CP 57A may instantiate user page 44 in, for example, the portion above 2G line 36 in frame 46. That is sufficient to dispatch user page 44 using system hardware, and those parts of CP program 57A that have been converted to 64-bit address mode as well.

CP64 51A is the portion of CP 57A that has been converted to 64-bit address mode so as to access storage locations above 2G line 36 and, therefore, will recognize and can access location 46. But, the other portion 50A of CP will not. With reference again to FIG. 2, heretofore, if CP 50 needs to access user page 44, it would have had to move, as is represented by line 47, user page 44 to a location 48 below 2G line 36 in real storage 30. While such data movement is expensive, there is more of a problem. That is, the relationship 41 between user page 40 and real frame 42, or relationship 43 between user page 44 and real frame 46 is ephemeral. If an I/O operation is in progress under control of CP 57, the association 41 of user page 40 into real page 42 must be pinned. Also, were the I/O operation in progress to be in the real page 46 instantiation of user page 44, relationship 43 would have to be pinned for the duration of the I/O operation; heretofore, that could not be done. The problem is, CP31 50 cannot access frame 46, for it is above 2G line 36; only CP64 51 can do that. It is, therefore, a constraint of CP 57 that pages resident in frames above 2G line 36, beyond the capability of 31 bit addressing, cannot be pinned in place.

Referring again to FIG. 3, the solution to this constraint is system execution area (SXA) 34. In order to not have to rewrite all of CP 50 to run in 64-bit address space 30, CP31 50 and CP64 51 are moved to SXA 34 and there instantiated as CP31 50A and CP64 51A.

Figure 1:
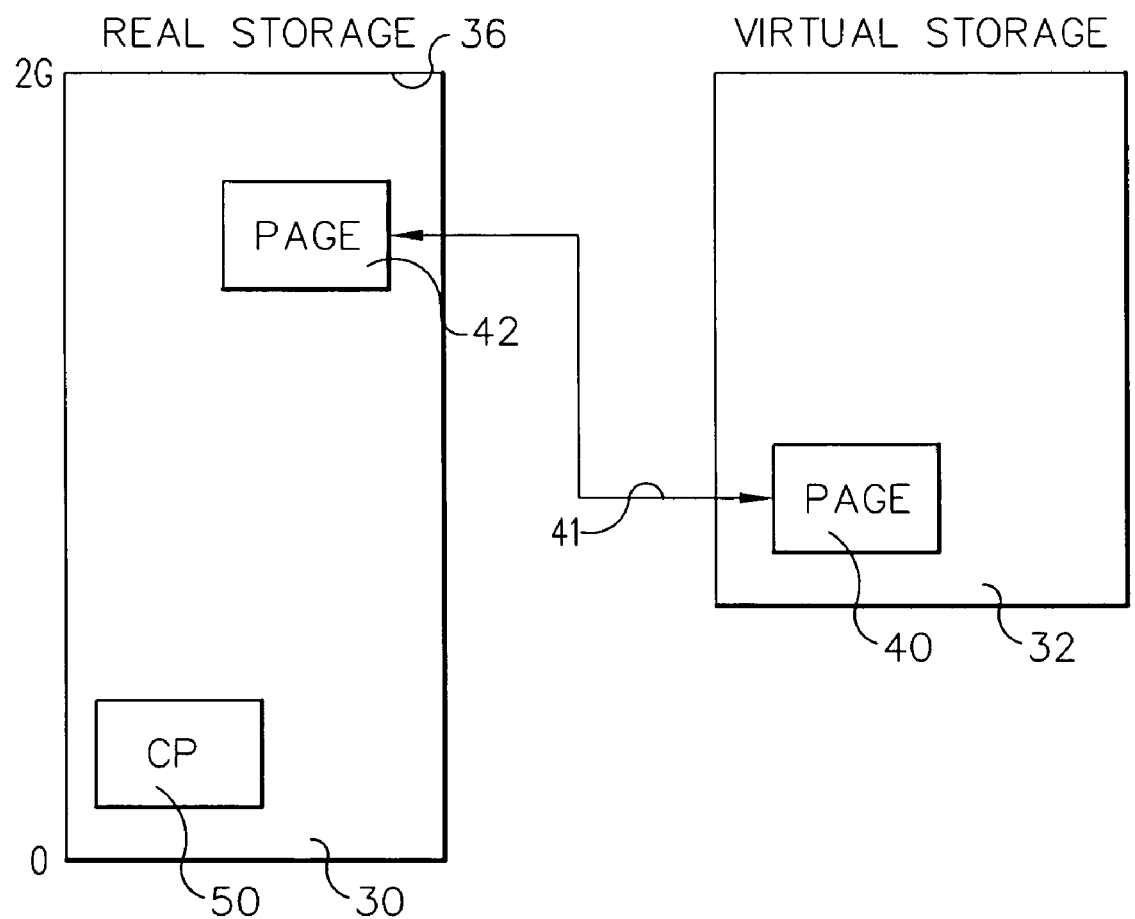
FIG. 1 is a schematic representation of a prior art storage configuration for an operating system.
Figure 2:
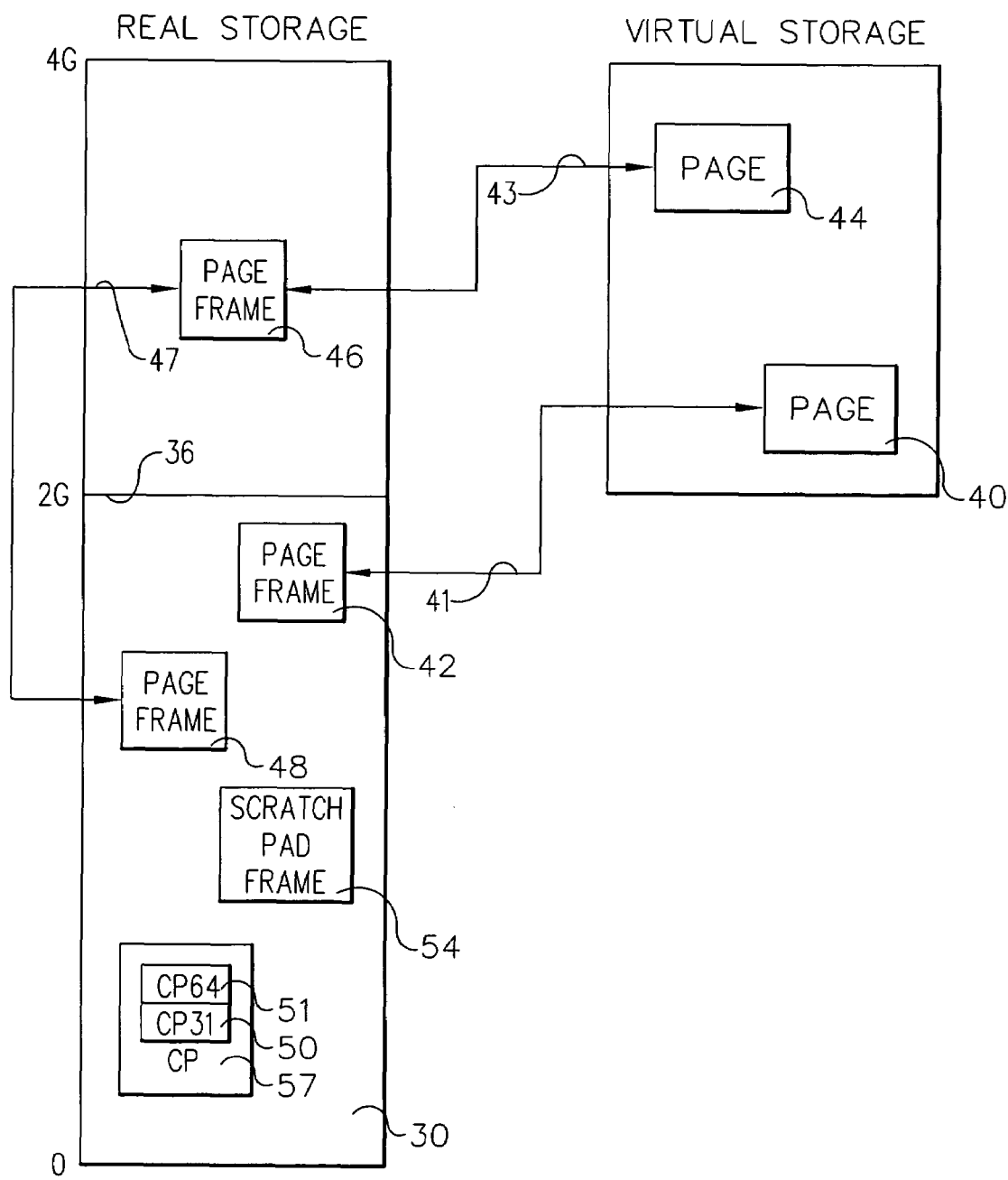
FIG. 2 is a schematic representation of real and virtual storage in accordance with another prior art storage configuration for an operating system.

Referring to FIG. 2, page 54 is a real frame that CP 50 is using as a scratch pad, not as a user storage, such as is the case with page frames 42 and 48.

Referring to FIG. 3, in SXA 34, page 54A is analogous to page 54: a scratch pad that the 31-bit portion CP31 50A of CP 57A can use. As is represented by line 55, scratch pad page 54A can be associated with real storage 30 frame 58, which may be below the 2G line 36, or above the 2G line as shown. As is represented by line 49, frames 59 are the CP backing frames in real storage 30 for CP 57A.

In order to access user pages using the capabilities of SXA 34, consider user page 44 instantiated (made resident) in real storage in frame 46 above 2G line 36. With this association, if a 31-bit routine or object in CP31 50A asks for or accesses page 44, it is not necessary to move page 44 below 2G line 36 to frame 48 location in real storage 30. Rather, an association 61 from alias page 60 to frame 46 is created, and thereby with user page 44 by way of association 43. In this manner, real frame 46 which contains user page 44 may be accessed by a 31-bit process or object of CP31 50A. Now, CP31 50A can pin the association 61 of alias page 60 to frame 46 for an I/O operation and give the address of frame 46 to an I/O adapter. This is because, when CP31 50A accesses frame 46, it does so through alias page 60 which, being pinned, stays associated with frame 46 instantiation of user page 44. By virtue of CP31 50A pinning alias page 60, objects 60, 46, and 44 are bound.

Thus, in accordance with the present invention, CP31 50A accesses user page 44 through alias page 60, and it is not necessary to move page 44 to a position 48 below the 2G line 36 in order to lock page 44 for I/O operations. These aliases 60 are transient, and may be released by CP 57A when it is done with them.

Figure 4:
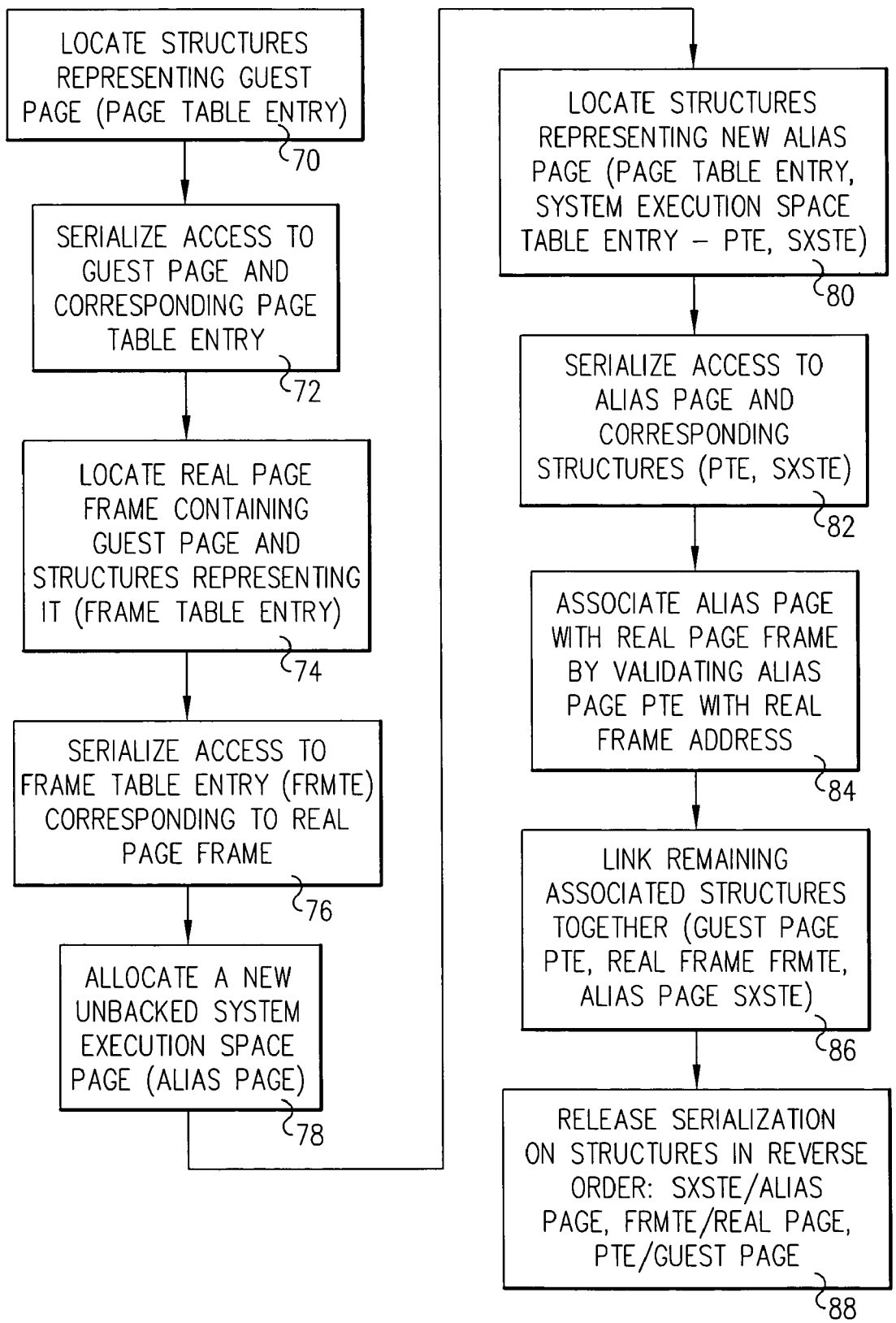
FIG. 4 is a flow chart representation of steps for creating an alias page 60 of FIG. 3.
Figure 6:
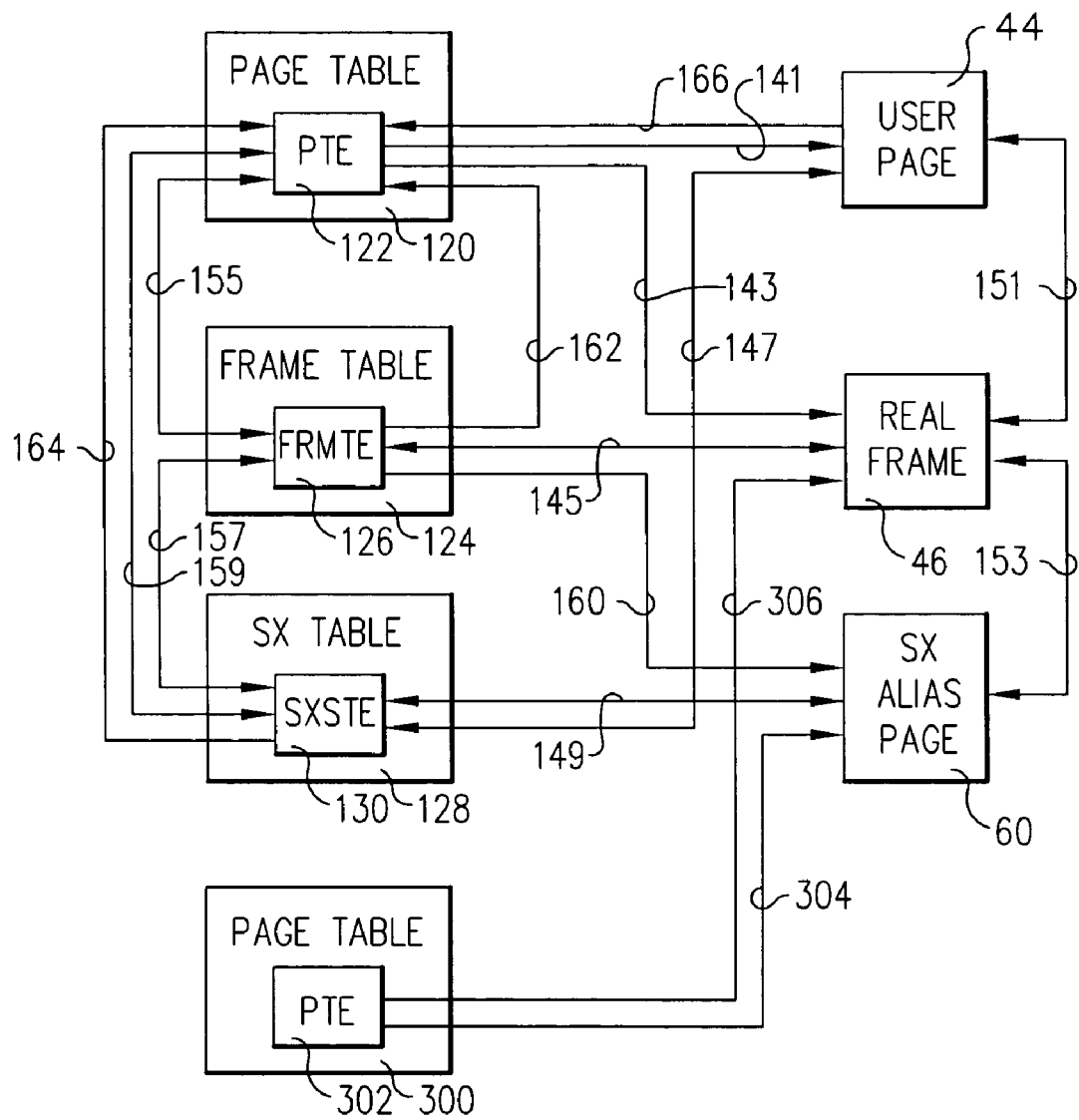
FIG. 6 is a system diagram illustrating structures for associating pages and frames in virtual and real storage.

Referring to FIG. 4 in connection with FIGS. 3 and 6, the steps for creating an alias page 60 are illustrated. Referring first to FIG. 6, in this example, a user or virtual page 44 is a starting page to be aliased. Structures associated with user page 44 include real frame 46, alias page 60, page table 120, frame table 124, system execution space (SXS) table 128, and system execution space page table 300.

Page table entry (PTE) 122 is an entry in page table 120, a z/Architecture structure (with non-architected z/VM software extensions) that defines the mapping 151 between a user page 44 and the real frame 46 which is associated with that page 44. This mapping is established by placing the address of frame 46 into PTE 122. Frame 46 is said to "back" page 44. As represented by line 153, frame 46 also backs alias page 60. Similarly, SXS PTE 302 is an entry in SXS page table 300 that defines a mapping 153 between alias page 60 and frame 46. This mapping is established by placing the address of frame 46 into SXS PTE 302. Line 304 represents an association by dynamic address translation from alias page 60 to page table 300 entry 302.

Figure 7:
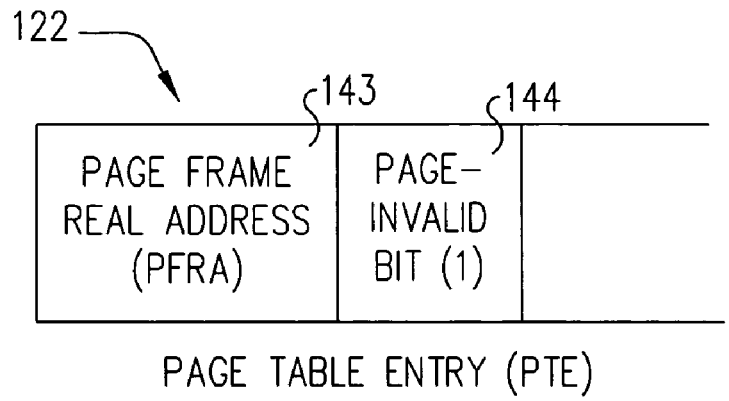
FIG. 7 represents the format of a page table entry (PTE).

Referring to FIG. 7, selected fields from page table entry 122 of interest to the present invention include page frame real address (PFRA) 143 and page invalid bit (I) 144. If bit 144 indicates a valid entry, page frame real address field 143 points to real frame 46, as is represented by line 143 in FIG. 6.

Frame table entry (FRMTE) 126 is a z/VM software structure in frame table 124 which is used to manage real storage 30 frames 46.

Figure 8:
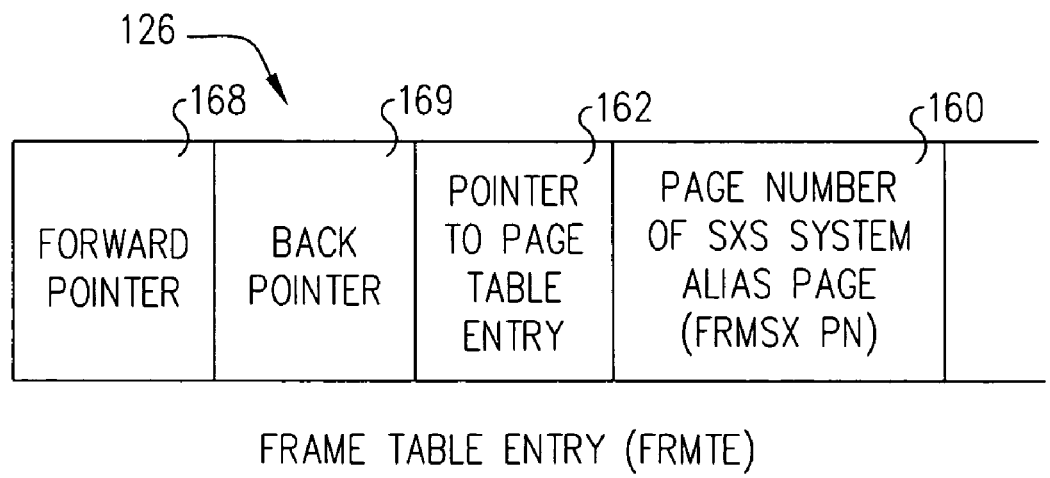
FIG. 8 represents the format of a frame table entry (FRMTE).

Referring to FIG. 8, selected fields from frame table entry (FRMTE) 126 of interest to the present invention include forward pointer 168, back pointer 169, pointer to page table entry 162, and page number of alias page 160, which is a pointer to alias page 60.

There exists a one to one mapping 145 between frame 46 and its associated FRMTE 126, using a bidirectional index conversion scheme to be described later.

An unbacked system execution area page is a virtual page in system execution area 34 which has no associated backing frame as of yet (that is, the corresponding SX PTE is said to be "invalid," with no associated frame or FRMTE.

System execution space table entry (SXSTE) 130 is a z/VM software structure within system execution space table 128 which is used to manage alias page 60 in system execution area 34. There is a one to one mapping 147 between SX page 60 (in this case, an alias page) and the associated SXSTE 130.

Figure 9:
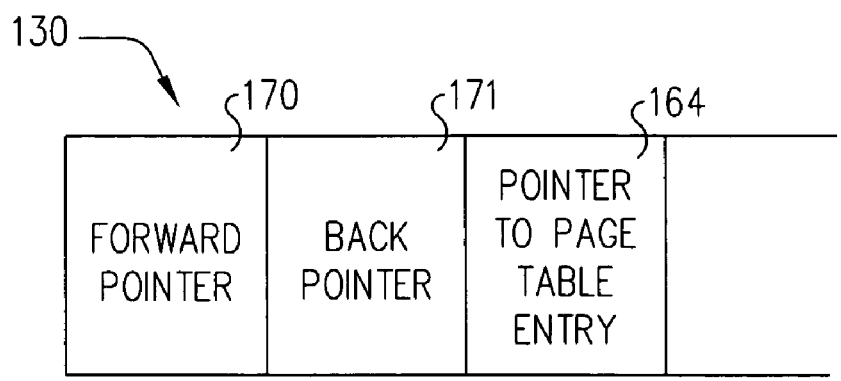
FIG. 9 represents the format of a system execution space table entry (SXSTE).

Referring to FIG. 9, selected fields from SXSTE 130 of interest to the present invention include forward pointer 170, back pointer 171, and pointer 164 to user-page page table entry 122. SXSTE 130 is similar to frame table entry (FRMTE) 126, without field 160.

Line 141 represents an association from PTE 122 to virtual page 44, using an extension to page table 120 that contains the virtual address of the segment containing the virtual page 44. Knowing the start of page table 120 in storage and the offset of PTE 122 into page table 120, a corresponding index offset into that segment is used to obtain the pointer 141 to virtual page 44.

To get from the address of frame 46 to FRMTE 126 or vice versa, a bidirectional index conversion is used. The offset of FRMTE 126 into frame table 124 is divided by the size of a FRMTE and multiplied by the size of a frame to obtain the corresponding frame address 46. Conversely, the frame address 46 may be divided and multiplied to obtain the offset of FRMTE 126 into frame table 124; this offset is then added to the origin of frame table 124 to obtain the address of FRMTE 126.

Line 166 represents an association by dynamic address translation from virtual page 44 to page table 120 entry 122. To get from entry 122 to alias page 60, link 143 is taken to real frame 46, and link 145 (the bidirectional index conversion described above) is taken from real frame address 46 to frame table entry 126 which describes that frame. Then, line 160 (representing alias page number 160 in FRMTE 126, as depicted in FIG. 8) is used to derive the address of alias page 60.

Line 149 represents a bi-directional index conversion between SXSTE 130 and alias page 60, analogous to that between FRMTE 126 and frame address 46.

A page 44 can be associated 151 with one (and only one) frame 46 (or none, if PTE 122 is invalid). A frame 46, however, can be associated with multiple pages—in this case, the original user page 44 as well as the alias page 60. The PTE 122, FRMTE 126, and SXSTE 130 structures can all be associated via pointers 143, 160, 162, and 164 contained within the structures themselves, and by indirect associations described below, thereby associating the corresponding user page 44, real frame 46, and alias page 60. Specifically, from any one of these structures, any other may be located, as follows:

PTE 122 representing user page 44 is associated (as represented by line 155) with FRMTE 126 by means of the PTE 122 containing the real address of frame 46 (represented by line 143) and then by means of the one to one index conversion 145 from the address of frame 46 to the address of FRMTE 126.

PTE 122 representing user page 44 is associated (as represented by line 159) with SXSTE 130 by means of the above association 155 between PTE 122 and FRMTE 126, and then by FRMTE 126 containing the SXS alias page number (represented by 160 in FIG. 8) to arrive at the address of alias page 60, from which the one to one index conversion represented by line 149 yields the address of SXSTE 130.

FRMTE 126 representing real frame 46 is associated (represented by line 155) with PTE 122 by means of the pointer to the page table entry (item 162 in FIG. 8).

FRMTE 126 representing real frame 46 is associated (represented by line 157) with SXSTE 130 (as above) via the SXS alias page number (160 in FIG. 8) and then by the one to one index conversion represented by line 149 to arrive at the address of SXSTE 130.

SXSTE 130 is associated (represented by line 159) with PTE 122 via the pointer to the PTE contained in the SXSTE (item 164 in FIG. 9).

SXSTE 130 is associated (represented by line 157) with FRMTE 126 via the above association 159 between SXSTE 130 and PTE 122, and then by association 155 between PTE 122 and FRMTE 126.

Through the use of the various pointers illustrated in FIGS. 6 and 8 described above, as will be apparent to those of skill in the art, all of the component elements 44, 46, 60, 122, 126, and 130 are related through the use of direct pointers and indirection.

Referring now to FIG. 4, in step 70 the page table entry structure (PTE) 122 representing user page 44 is located. In step 72, access to page table entry 122 is serialized. In step 74, real page frame 46 containing user page 44 and the frame table entry (FRMTE) structure 126 representing it are located. In step 76 access to frame table entry 126 is serialized.

In step 78, an available unbacked alias page 60 is allocated. In step 80, alias page table entry 302 and system execution space table entry 130 representing (line 149) the new alias page 60 are located. In step 82, access to corresponding structures alias page PTE 302 and SXSTE 130 is serialized.

In step 84, alias page 60 is associated with real frame 46 by validating alias page PTE 302 with the address of real frame 46.

In step 86, remaining user page PTE 122, real frame FRMTE 126, and alias page SXSTE 130 structures are linked together. In step 88, serialization on these structures is released, that is: SXSTE 130 and alias page PTE 302, FRMTE 126, PTE 122.

Figure 5:
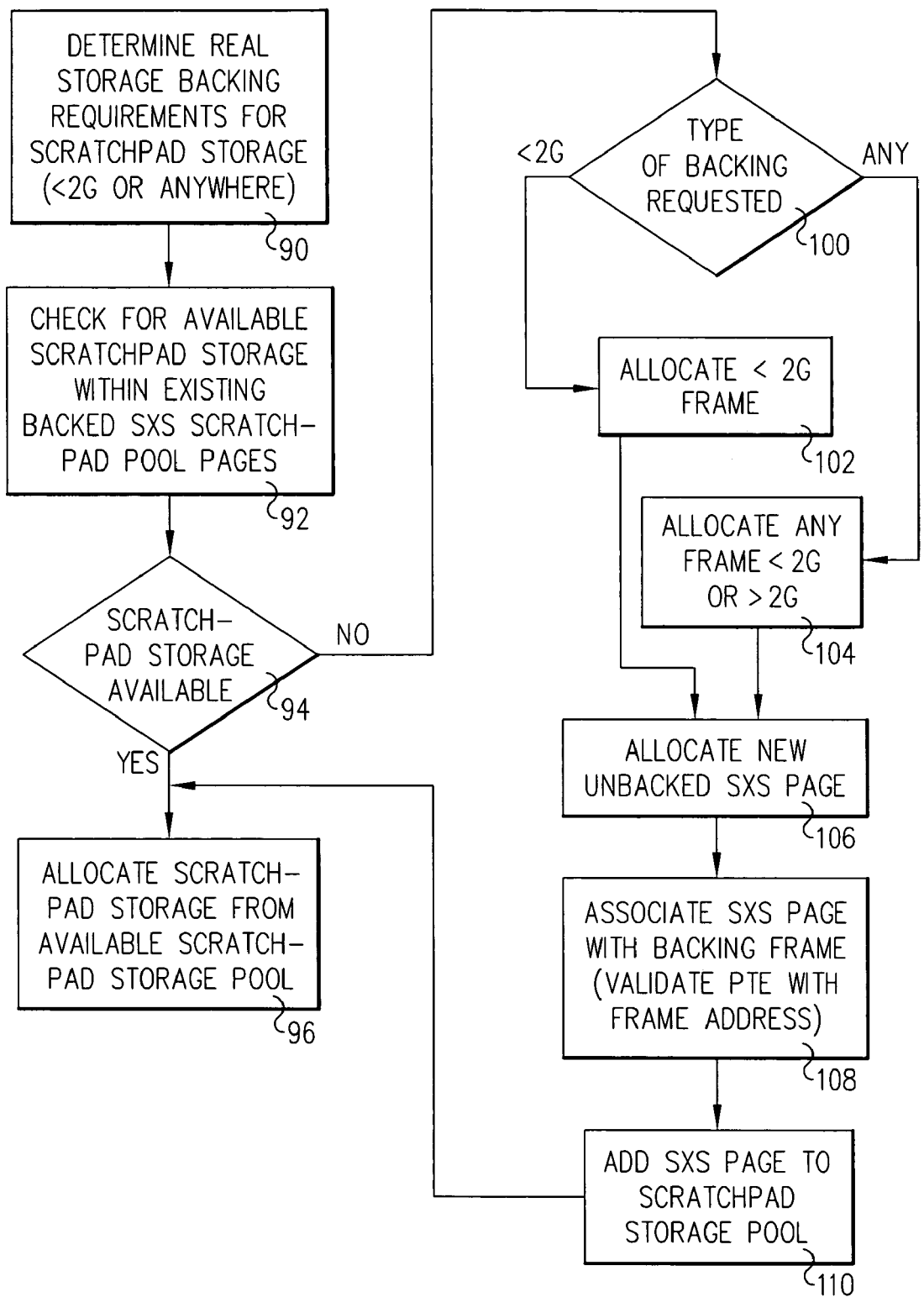
FIG. 5 is a flow chart representation of steps for instantiating scratch pad page 54B of FIG. 3.

Referring to FIG. 5 in connection with FIG. 3, the steps for instantiating scratch pad page 54A are described. System execution area (SXA) 34 contains virtual storage referenced by CP31 50A, the 31-bit portion of control program 57A. The real storage backing characteristics (either below 2G line 36 or "any", meaning anywhere within real storage 30) are specified by the caller (and default to "any"). A pool 62 of scratchpad pages 54A, 54B with available space is maintained in SXA 34. If sufficient space is not available in the page(s) 54A in the existing scratchpad pool 62, a new page 54B must be allocated and associated with a new backing frame 58B of the appropriate type (that is below 2G line 36 or "any"), and then the new page 54B must be added to the scratchpad pool 62.

For performance purposes, two queues 62 of fully available scratchpad pages already backed with frames of the appropriate type may be kept.

Referring now to FIG. 5, in step 90 in response to a caller requesting scratchpad storage, real storage backing requirements are determined. The caller may request backing storage below the 2G line 36, or "any", or absent a specific request "any" is determined.

In steps 92 and 94, existing backed scratchpad pool pages 54A are checked for available storage. If sufficient storage is available, in step 96 scratchpad storage from available scratchpad storage pool 54A is allocated. If sufficient storage is not available, in step 100 the type of backing request is analyzed to determine if space is required below 2G line 36. If so, in step 102 a frame below the 2G line is allocated. If "any", in step 104 a frame anywhere in store 30 is allocated.

In step 106, a new unbacked page 54B in SXA 34 is allocated and, in step 108, associated with the backing frame 58B allocated in step 102 or 104 by validating the PTE in SX page table 300 which corresponds to page 54B with the address of frame 58B. In step 110 SXS page 54B is added to scratchpad storage pool 62 and in step 96 scratchpad storage from available scratchpad storage pool 54B is allocated.

Alternative Embodiments

Figure 10:
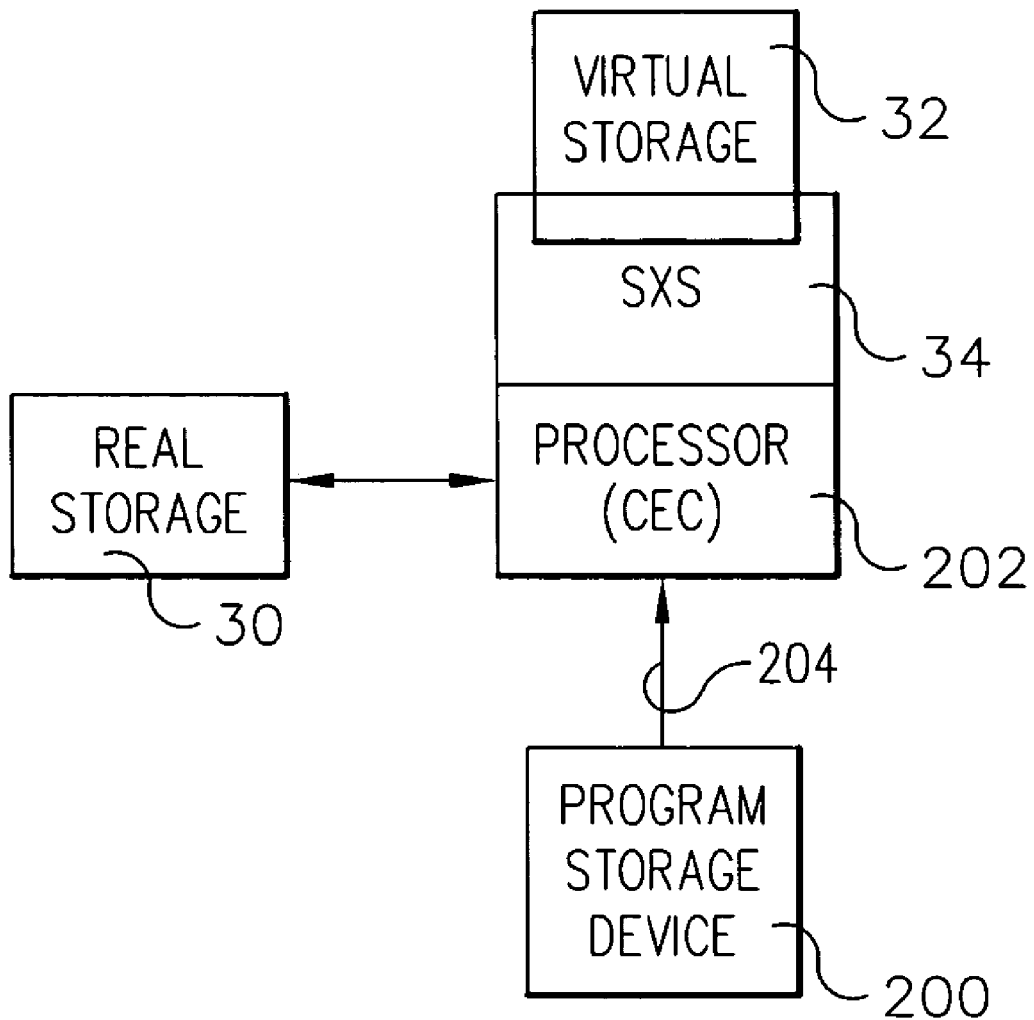
FIG. 10 is a high level system diagram illustrating a program storage device readable by a machine, tangibly embodying a program of instructions executable by a machine to perform method steps for mapping address space.

It will be appreciated that, although specific embodiments of the invention have been described herein for purposes of illustration, various modifications may be made without departing from the spirit and scope of the invention. Referring to FIG. 10, in particular, it is within the scope of the invention to provide a computer program product, program storage or memory device 200 such as a tape or disc, or the like, for storing signals readable by a machine as is illustrated by line 204, for controlling the operation of a computer 202, such as a host system, central electronic complex (CEO) or storage controller, according to the method of the invention and/or to structure its component, including real storage 30, SXS 34 and virtual storage 32, in accordance with the system of the invention.

Further, each step of the method may be executed on any general purpose computer 202, such as IBM Systems designated as zSeries, iSeries, xSeries, and pSeries, or the like and pursuant to one or more, or a part of one or more, program elements, modules or objects generated from any programming language, such as C++, Java, Pl/1, Fortran or the like. Further again, each said step, or a file or object or the like implementing each said step, may be executed for any pair of a smaller and a larger address size. And still further, each said step, or a file or object or the like implementing each said step, may be executed by special purpose hardware or a circuit module designed for that purpose.

Accordingly, the scope of protection of this invention is limited only by the following claims and their equivalents.

What is claimed is:

1. A method for mapping address space to enable access of said address space by an operating system including upgraded and legacy portions, said upgraded portion operating in a first address mode capable of accessing all of said address space and said legacy portion operating in a second address mode capable of accessing only a subset of said address space, comprising:

providing real storage including first and second address spaces, said second address space being smaller than and contained within said first address space;

providing virtual storage;

providing within said virtual storage a system execution space (SXS);

providing within said system execution space a system execution area (SXA) having a size equal to or less than said second address space, both SXS and SXA being subsets of said real storage;

providing within said system execution area said operating system comprising a control program including first and second portions, said first portion being an upgraded portion capable of addressing said first address space and said system execution space, said second portion being a legacy portion capable of addressing any address within real storage aggregating to less than said first address space;

providing within said system execution area at least one alias page;

responsive to a control program request for a first page in said virtual storage, dynamically assigning a first frame in said real storage corresponding to said page;

responsive to a request from said second portion of said control program for said first page, dynamically assigning an alias page in said system execution area, and assigning said alias page to said first frame, thereby also mapping said first frame to said first page in said virtual storage, without moving said first page into a frame in real storage directly addressable by said legacy portion of said operating system;

responsive to a first request from said first portion of said control program to pin said first page, pinning said first page; and responsive to a second request from said second portion of said control program to pin said first page, assigning an alias page for pinning said first page on behalf of said second request without moving said first page thereby providing concurrent access to both said system execution area by said legacy portion of the operating system and all of real storage by said upgraded portion of said operating system.

2. The method of claim 1, further comprising:
selectively pinning pages into said system execution area for providing an interface for compatibility by programs executed by said second portion of said control program.

3. The method of claim 1, further comprising:
said second portion of said control program accessing said first page through said alias page.

4. The method of claim 1, further comprising:
providing a page table with an entry for defining the mapping between said first page and said first frame;
providing a frame table with an entry for managing said first frame within said real storage space;
providing a system execution space table for managing said alias page within said system execution area; and
providing a system execution space page table with an entry for defining a mapping between said alias page and said first frame.

5. The method of claim 4, further comprising a one-to-one mapping of said frame to said frame table entry, a one-to-one mapping of said alias page in said system execution area to an entry in said system execution space table, and a one-to-many mapping of said frame to said first page and said system execution area alias page.

6. The method of claim 4, further comprising aliasing user page by:
locating in said page table the page table entry representing said user page;
serializing access to said page table entry;
locating in said frame table the frame table entry representing the frame corresponding to said user page;
serializing access to said frame table entry;
assigning an alias page as an unbacked system execution area page;
locating structures, including an SXS page table entry and a system execution space table entry representing said alias page respectively in said SXS page table and in said system execution space table;
serializing access to said structures representing said alias page;
associating said alias page with said user page frame by validating said SXS page table entry with the address of said real frame corresponding to said user page;
linking said user page table entry, said real frame table entry, and said system execution space table entry corresponding to said alias page; and
releasing serialization on structures representing said alias page, frame table entry, and user page table entry.

7. A system for mapping address space to enable access of said address space by an operating system including upgraded and legacy portions, said upgraded portion operating in a first address mode capable of accessing all of said address space and said legacy portion operating in a second address mode capable of accessing only a subset of said address space, comprising:
real storage including first and second address spaces, said second address space being smaller than and contained within said first address space;
virtual storage;
a system execution space (SXS) within said virtual storage;
a system execution area (SXA) within said system execution space having a size equal to or less than said second address space, both SXS and SXA being subsets of said real storage;
a control program within said system execution area, said control program including first and second portions, said first portion being an upgraded portion capable of addressing said first address space and said system execution space, said second portion being a legacy portion constrained to address only any address within real storage aggregating to less than said first address space;
said system execution area including at least one alias page;
said control program including means, responsive to a request for a first page in said virtual storage, for dynamically assigning a first frame in said real storage corresponding to said page;
said control program including means, responsive to a request from said second portion of said control program for said first page, for dynamically assigning in said system execution area said alias page to said first frame, thereby also mapping said first frame to said first page in said virtual storage, without moving said first page into a frame in real storage directly addressable by said legacy portion of said control program;
said control program including means, responsive to a first request from said firsts portion of said control program to pin said first page, for pinning said first page; and
said control program including means, responsive to a second request from said second portion of said control program to pin said first page, for assigning an alias page for pinning said first page on behalf of said second request without moving said first page thereby providing concurrent access to both said system execution area by said legacy portion of the control program and all of real storage by said upgraded portion of said control program.

8. The system of claim 7, further comprising:
a page table with an entry for defining the mapping between said first page and said first frame;
a frame table with an entry for managing said first frame within said real storage space;
a system execution space table for managing said alias pages within said system execution area; and
a system execution space page table with an entry for defining a mapping between said alias page and said first frame.

9. A computer program product to enable access of address space by an operating system including upgraded and legacy portions, said upgraded portion operating in a first address mode capable of accessing all of said address space and said legacy portion operating in a second address mode capable of accessing only a subset of said address space comprising:
a computer readable storage medium;

first program instructions to define first and second address spaces in real storage, said second address space being smaller than and contained within said first address space;

second program instructions to define virtual storage;

third program instructions to define within said virtual storage a system execution space (SXS);

fourth program instructions to define within said system execution space a system execution area (SXA) having a size equal to or less than said second address space, both SXS and SXA being subsets of said real storage;

fifth program instructions to define within said system execution area a control program including first and second portions, said first portion being an upgraded portion capable of addressing said first address space and said system execution space, said second portion being a legacy portion capable of addressing any address with real storage aggregating to less than said first address space;

sixth program instructions to define within said system execution area at least one alias page;

seventh program instructions, responsive to a control program request for a first page in said virtual storage, to dynamically assign a first frame in said real storage corresponding to said page;

eighth program instructions, responsive to a request from said second portion of said control program for said first page to dynamically assign an alias page in said system execution area and assign said alias page to said first frame, thereby also mapping said first frame to said first page in said virtual storage, without moving said first page into a fram in real storage directly addressable by said legacy portion of said control program;

ninth program instructions responsive to a first request from said first portion of said control program to pin said first page, to pin said first page; and tenth program instructions responsive to a second request from said second portion of said control program to pin said first page, to assign an alias page for pinning said first page on behalf of said second request without moving said first page thereby providing concurrent access to both said system execution area by said legacy portion of the control program and all of real storage by said upgraded portion of said control program; and wherein said first, second, third, fourth, fifth, sixth, seventh, eighth, ninth and tenth program instructions are stored on said media.

10. The computer program product of claim 9, further comprising eleventh program instructions within said second portion of said control program to access said first page through said alias page, and wherein said eleventh program instructions are stored on said medium.

11. The computer program product of claim 9, further comprising:

eleventh program instructions to provide a page table with an entry for defining the mapping between said first page and said first frame;

twelfth program instructions to provide a frame table with an entry for managing said first frame within said real storage space;

thirteenth program instructions to provide a system execution space table for managing said alias page within said system execution area; and fourteenth program instructions to provide a system execution space page table with an entry for defining a mapping between said alias page and said first frame, and wherein said eleventh, twelfth, thirteenth and fourteenth program instructions are stored on said medium.

12. The computer program product of claim 11, further comprising fifteenth program instructions to provide a one-to-one mapping of said frame to said frame table entry, a one-to-one mapping of said alias page in said system execution area to an entry in said system execution space table, and a one-to-many mapping of said frame to said first page and said system execution area alias page, and wherein said fifteenth program instructions are stored on said medium.

13. The computer program product of claim 11, further comprising fifteenth program instructions to alias a user page by:

locating in said page table the page table entry representing said user page;

serializing access to said page table entry;

locating in said frame table the frame table entry representing the frame corresponding to said user page;

serializing access to said frame table entry;

assigning an alias page as an unbacked system execution area page;

locating structures, including an SXS page table entry and a system execution space table entry representing said alias page respectively in said SXS page table and in said system execution space table;

serializing access to said said structures representing said alias page;

associating said alias page with said user page frame by validating said SXS page table entry with the address of said real frame corresponding to said user page;

linking said user page table entry, said real frame table entry, and said system execution space table entry corresponding to said alias page; and releasing serialization on structures representing said alias page, frame table entry, and user page table entry, and wherein said fifteenth program instructions are stored on said medium.

* * * * *